United States Patent
Hämäläinen et al.

(10) Patent No.: US 9,794,830 B2
(45) Date of Patent: Oct. 17, 2017

(54) CONTROLLING COMMUNICATION DEVICES IN A COMMUNICATION SYSTEM

(71) Applicant: Nokia Solutions and Networks Oy, Espoo (FI)

(72) Inventors: Seppo Olavi Hämäläinen, Espoo (FI); Rauli Juhani Parkkali, Helsinki (FI); Haitao Tang, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 10 days.

(21) Appl. No.: 14/893,120

(22) PCT Filed: May 27, 2013

(86) PCT No.: PCT/EP2013/060869
§ 371 (c)(1),
(2) Date: Nov. 23, 2015

(87) PCT Pub. No.: WO2014/191015
PCT Pub. Date: Dec. 4, 2014

(65) Prior Publication Data
US 2016/0105820 A1    Apr. 14, 2016

(51) Int. Cl.
| | |
|---|---|
| *H04W 28/08* | (2009.01) |
| *H04W 48/18* | (2009.01) |
| *H04W 72/08* | (2009.01) |
| *H04W 72/10* | (2009.01) |
| *H04W 8/18* | (2009.01) |
| *H04W 88/02* | (2009.01) |

(52) U.S. Cl.
CPC ............ *H04W 28/08* (2013.01); *H04W 48/18* (2013.01); *H04W 72/08* (2013.01); *H04W 72/10* (2013.01); *H04W 8/18* (2013.01); *H04W 88/02* (2013.01)

(58) Field of Classification Search
CPC ..... H04W 28/08; H04W 72/10; H04W 72/08; H04W 12/08; H04W 48/16; H04W 48/20; H04W 88/02; H04W 88/08
See application file for complete search history.

(56) References Cited

U.S. PATENT DOCUMENTS

| | | | |
|---|---|---|---|
| 2011/0176424 A1* | 7/2011 | Yang | H04L 41/0803 370/236.2 |
| 2012/0295630 A1* | 11/2012 | Wang | H04W 8/24 455/452.1 |

FOREIGN PATENT DOCUMENTS

| | | |
|---|---|---|
| WO | WO 2009/149600 A1 | 12/2009 |
| WO | WO 2014/056544 A1 | 4/2014 |
| WO | WO 2014/056551 A1 | 4/2014 |

OTHER PUBLICATIONS

Huawei; "Idle mode Inter RAT load balancing"; R3-080757; 3GPP TSG RAN WG3 Meeting #59 bis; Shenzhen, China, Mar. 31-Apr. 3, 2008; whole document (5 pages).

(Continued)

*Primary Examiner* — Jamal Javaid
(74) *Attorney, Agent, or Firm* — Harrington & Smith

(57) ABSTRACT

Access technology priority lists and related access list identifiers are maintained in a radio access system such that at least one access list identifier is associated with a plurality of access technology priority lists. Behavior of at least one communication device in the radio access system is controlled by selecting one of the access technology selection priority lists based on information (such as load conditions or quality of service class) regarding an access list identifier and the radio access system.

16 Claims, 5 Drawing Sheets

(56) References Cited

OTHER PUBLICATIONS

Huawei Technologies Co. Ltd. et al.; "Discussion on dedicated priority and SPID applied in GERAN"; GP-081799; 3GPP TSG GERAN #40; Miami, US, Oct. 2008; whole document (7 pages).

* cited by examiner

| | | AP = CellReselectionPriority | | | | | | | |
|---|---|---|---|---|---|---|---|---|---|
| Load level | RFSP Index | 7 | 6 | 5 | 4 | 3 | 2 | 1 | 0 |
| Low load | 1 | LTE2.6 | LTE800 | UMTS2.1 | UMTS900 | 2G1800 | 2G900 | | |
| Intermediate | 1 | LTE2.6 | LTE800 | UMTS2.1 | UMTS900 | 2G1800 | 2G900 | | |
| High load | 1 | LTE2.6 | LTE800 | UMTS2.1 | UMTS900 | 2G1800 | 2G900 | | |
| Low load | 2 | LTE2.6 | LTE800 | UMTS2.1 | UMTS900 | 2G1800 | 2G900 | | |
| Intermediate | 2 | LTE800 | UMTS2.1 | UMTS900 | 2G1800 | 2G900 | | | |
| High load | 2 | UMTS2.1 | UMTS900 | 2G1800 | 2G900 | | | | |
| ... | ... | ... | ... | ... | ... | ... | ... | | |
| Low load | 256 | LTE2.6 | LTE800 | UMTS2.1 | UMTS900 | 2G1800 | 2G900 | | |
| Intermediate | 256 | UMTS2.1 | UMTS900 | 2G1800 | 2G900 | | | | |
| High load | 256 | 2G1800 | 2G900 | | | | | | |

Table 1

Fig. 5

| Load level | AP = CellReselectionPriority | | | | | | | |
|---|---|---|---|---|---|---|---|---|
| | 7 | 6 | 5 | 4 | 3 | 2 | 1 | 0 |
| Low load | LTE2.6 | LTE800 | UMTS2.1 | UMTS900 | 2G1800 | 2G900 | | |
| Intermediate | UMTS2.1 | UMTS900 | 2G1800 | 2G900 | | | | |
| High load | 2G1800 | 2G900 | | | | | | |

Table 2

Fig. 6

| Segment | RFSP Index | AP = CellReselectionPriority | | | | | | | |
|---|---|---|---|---|---|---|---|---|---|
| | | 7 | 6 | 5 | 4 | 3 | 2 | 1 | 0 |
| 1 | 1 | LTE2.6 | LTE800 | UMTS2.1 | UMTS900 | 2G1800 | 2G900 | | |
| 1 | 2 | LTE2.6 | LTE800 | UMTS2.1 | UMTS900 | 2G1800 | 2G900 | | |
| 1 | 3 | LTE2.6 | LTE800 | UMTS2.1 | UMTS900 | 2G1800 | 2G900 | | |
| 2 | 4 | UMTS2.1 | UMTS900 | 2G1800 | 2G900 | | | | |
| 2 | 5 | UMTS2.1 | UMTS900 | 2G1800 | 2G900 | | | | |
| 2 | 6 | UMTS2.1 | UMTS900 | 2G1800 | 2G900 | | | | |
| ... | | ... | ... | ... | ... | | | | |
| 85 | 253 | 2G1800 | 2G900 | | | | | | |
| 85 | 254 | 2G1800 | 2G900 | | | | | | |
| 85 | 255 | 2G1800 | 2G900 | | | | | | |

Table 3

Fig. 7

CONTROLLING COMMUNICATION DEVICES IN A COMMUNICATION SYSTEM

This disclosure relates to a communication system and in particular control of communication device behaviour in an access system.

A communication system can be seen as a facility that enables communication sessions between two or more entities such as fixed or mobile communication devices, base stations, servers, machine type communication devices and/or other communication nodes. A communication system and compatible communicating entities typically operate in accordance with a given standard or specification which sets out what the various entities associated with the system are permitted to do and how that should be achieved. For example, the standards, specifications and related protocols can define the manner how various aspects of communication shall be implemented between communicating devices. The various development stages of the standard specifications are referred to as releases.

A communication can be carried on wired or wireless carriers. In a wireless communication system at least a part of communications between stations occurs over a wireless link. Examples of wireless systems include public land mobile networks (PLMN) such as cellular networks, satellite based communication systems and different wireless local networks, for example wireless local area networks (WLAN). The systems can use various radio access technologies (RAT) and can operate in different frequencies. A wireless system can be divided into cells or other radio coverage or service areas provided by a station. Radio service areas can overlap, and thus a communication device in an area can send and receive signals within more than one station. A communication device may also move from a cell to another and also between different access technologies and/or frequencies. Each radio service area is controlled by an appropriate controller apparatus. Higher level control may be provided by another control apparatus controlling a plurality of radio service areas.

A wireless communication system can be accessed by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station and/or one or more other user equipment.

In a wireless system subscribers can be steered to appropriate radio access technology and/or frequency. Steering is considered advantageous because it can be used to address issues such as the different capabilities of different network technologies, different end user devices, the variety of available services, different user behaviour and capacity and load in different radio access technologies and/or frequencies. In order to serve customer demand and to be able to offer best possible customer experience subscribers are typically treated as individuals, i.e. on a case by case basis. Optimization is provided from network perspective and decisions are done in network elements. However, the network is often not aware of all possible factors that might have an effect on the operation of a particular user device and/or radio access network. Thus decisions like those associated with handovers (HOs) are done without awareness of expected customer experience level for individual users. Customer experience insight may be provided e.g. by customer experience management (CEM) tooling or the like. However, such tools cannot be used to provide feedback information substantially in real-time and thus cannot be used where fast action may be required by e.g. a load balancing function.

Steering can be provided based on priority lists. These can be used to control the order in which a user equipment selects/reselects a cell. Current third generation partnership (3GPP) standards (Release 8 and onwards) allow for sending of one absolute priority (AP) list to a user equipment (UE) over broadcast or dedicated signalling. It is noted that although term 'priority list' is used herein these lists are not necessarily in the form of a listing but can be provided in the form of data that can nevertheless be understood as a logical list. In case of broadcast signalling the AP list is same for all users under that cell for all possible scenarios. In case of dedicated signalling it is possible for the base station to differentiate subscribers by selecting a proper AP list based on subscriber specific RAT frequency selection priority index (RFSPid). Dedicated signaling may take place e.g. in a RRC Connection Release message. Only one AP list is sent to UE and this AP list is supposed to work for all load and other situations that may occur in a cell.

3GPP Release 8 introduced a mechanism to impact RAT/frequency selection when a user equipment (UE) is in idle mode. The UE receives an absolute priority (AP) list from the network including camping priority information for different RATs/Frequencies. The UE selects RAT/frequency for camping based on priority provided by the list. Next time when the UE is setting up the connection it will perform connection set-up in the same RAT/frequency to which it was camped to. In addition to the idle mode traffic steering, active mode users can be steered to another RAT/frequency by means of load balancing. Load balancing can take load situation in a cell into account. However, load balancing does not take information such as customer experience into account, and therefore load balancing cannot be used to control which users would be preferred candidates for steering e.g. from customer experience point of view. Overall, an improved way of controlling users might be desired.

Embodiments of the invention aim to address one or several of the above issues.

It is noted that the issues are not limited to any particular communication system, standard, specification, radios and so forth, but may occur in any communication device and/or system.

In accordance with an aspect there is provided a method for a radio access system, the method comprising maintaining access technology priority lists and related access list identifiers in a radio access system such that at least one access list identifier is associated with a plurality of access technology priority lists, and controlling behaviour of at least one communication device in the radio access system by selecting one of the access technology selection priority lists based on information regarding an access list identifier and the radio access system.

In accordance with another aspect there is provided an apparatus for a radio access system, the apparatus comprising at least one processor, and at least one memory including computer program code, wherein the at least one memory and the computer program code are configured, with the at least one processor, to maintain access technology priority lists and related access list identifiers such that at least one access list identifier is associated with a plurality of access technology priority lists, and control behaviour of at least one communication device in the radio access system based on access technology selection priority list selection based on information regarding an access list identifier and the radio access system.

In accordance with a mode detailed aspect the plurality of access technology priority lists associated with the at least one access list identifier are configured for different load conditions and a priority list is selected based on load information and/or the priority lists are configured for different quality of service classes and a priority list is selected based on quality of service class information.

The access list identifier may comprise a radio access technology frequency selection priority index.

A plurality of radio access technology frequency selection priority indexes may be grouped wherein the at least one access list identifier comprises an identifier of a group of radio access technology frequency selection priority indexes. A group of radio access technology frequency selection priority indexes may be selected and behaviour of the communication device controlled by selection of one of the radio access technology frequency selection priority indexes in the group. Each radio access technology frequency selection priority index within a group may be associated with a different control feature. A control feature can then be selected for a communication device by selecting a radio access technology frequency selection priority index from the group. A configuration may be used for idle mode camping where several radio access technology frequency selection priority indexes are mapped to the same access priority list.

Selection of at least one of the associated access priority lists may be used for at least one of traffic steering, load balancing, congestion control, admission control, and packet scheduling.

A node for a radio access network such as a base station and/or a controller thereof, an enhanced nodeB, or a radio network controller comprising the apparatus may also be provided. The node is adapted to select a priority list.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are also described in the following detailed description of examples embodying the invention and in the attached claims.

The invention will now be described in further detail, by way of example only, with reference to the following examples and accompanying drawings, in which:

FIGS. 5 to 7 shows examples of priority list sets.

In the following certain exemplifying embodiments are explained with reference to a wireless or mobile communication system serving mobile communication devices. Therefore, before explaining in detail the exemplifying embodiments, certain general principles of a wireless communication system, components thereof, and mobile communication devices are briefly explained with reference to FIGS. 1 and 2 to assist in understanding the technology underlying the described examples.

Figure 1:
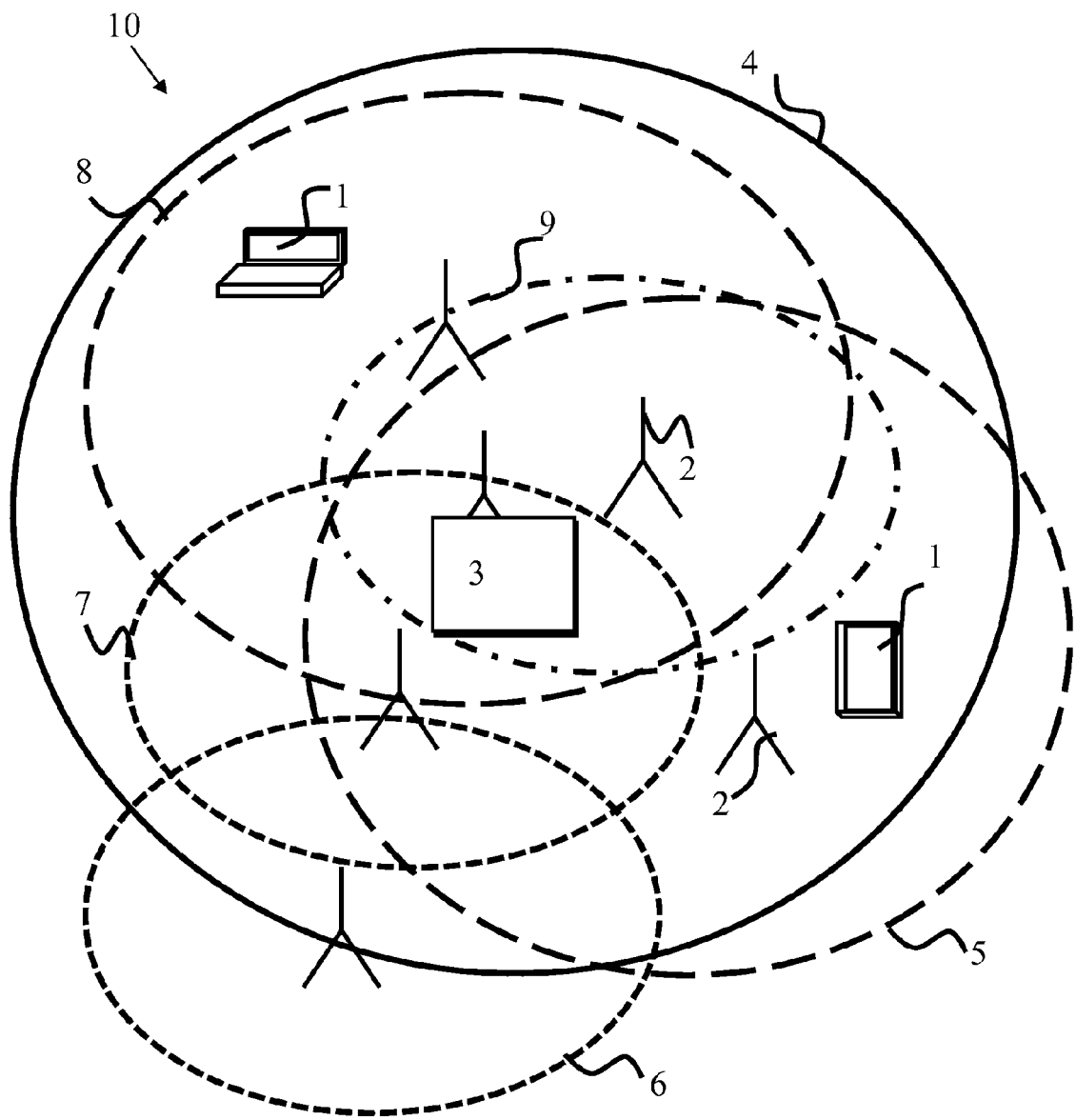
FIG. 1 shows an example of a communication system wherein below described examples of the invention may be implemented.

FIG. 1 shows schematically a multilayered cellular system 10 comprising a plurality of overlapping radio service areas or cells 4 to 9. Each of the cells is provided by an access point, such as a base station 2, a remote radio head or similar wireless transceiver node. Since a base station provides a cell, these terms are used interchangeably in this specification where appropriate. The difference in access technology and/or frequency is denoted by the difference in the dashing of the cell border lines. It is noted that in the context of selection terms "access technology" and "frequency" are also used interchangeably in this specification and therefore a reference to one of the terms shall be understood as a reference to the other, either alone or in combination, where appropriate.

It is also noted that the cells are shown schematically to have substantially circular form for illustration purposes. It is also noted that a great number of radio service areas may be provided in a cellular communication system, each cell may serve a number of mobile devices and that a mobile communication device may simultaneously be located in a plurality of cells. Also, a transceiver node site can provide more than one cell and/or a plurality of sectors, for example three radio sectors, each sector providing a cell or a sub radio service area of a cell.

A mobile communication device 1 is typically provided wireless access via at least one access point/base station providing a cell. The mobile communication devices are provided with mobility, i.e. can move from a cell to the other. A communication device may also need to select another cell for other reasons, e.g. signal quality, congestion and so on.

A non-limiting example of communication systems is the long-term evolution (LTE) of the Universal Mobile Telecommunications System (UMTS) that is standardized by the 3rd Generation Partnership Project (3GPP). A LTE base station is known as evolved or enhanced NodeB (eNB) in the vocabulary of the 3GPP specifications. LTE based access systems can employ a mobile architecture known as the Evolved Universal Terrestrial Radio Access Network (E-UTRAN). In a more detailed level, the cells may provide radio access based on, for example, at least some of the following technologies: LTE2.6 GHz, LTE800 MHz, UMTS2.1 GHz, UMTS900 MHz, 2G1800 MHz, and 2G900 MHz. Other examples of radio services providing a mobile device with access to a communication system include those provided by stations of systems that are based on technologies such as wireless local area network (WLAN) and/or WiMax (Worldwide Interoperability for Microwave Access). WLANs are sometimes referred to by WiFi™, a trademark that is owned by the Wi-Fi Alliance, a trade association promoting Wireless LAN technology and certifying products conforming to certain standards of interoperability.

A cell is typically controlled by at least one appropriate controller 3. For example, a base station can be provided with controller apparatus so as to enable operation thereof and management of mobile communication devices in communication with the station. Examples of appropriate network elements providing the control include an eNB where the controller is integrated with the base station, a radio network controller (RNC) or a base station controller (BSC). The control apparatus can be interconnected with other control entities.

Figure 2:
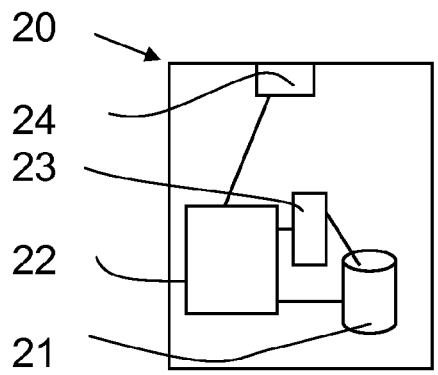
FIG. 2 shows an example of control apparatus.

FIG. 2 shows an example of a control apparatus for a device, for example to be integrated with, coupled to and/or otherwise for controlling any of base stations of FIG. 1. The control apparatus 20 can be configured to provide control functions in association with communication in general, and at least the cell selection/reselection aspect in accordance with certain embodiments described below. For this purpose the control apparatus comprises at least one memory 21, at least one data processing unit 22, 23 and an input/output interface 24. Via the interface the control apparatus can be coupled to a receiver and a transmitter of the device or otherwise to other elements of the system. The control apparatus can be configured to execute an appropriate software code to provide the control functions. The data processing, storage and other relevant control apparatus can be provided on an appropriate circuit board and/or in chipsets.

The communication device 1 provides an apparatus that a user can use for communication. Such a communication device is often referred to as user equipment (UE) or terminal. An appropriate mobile communication device may be provided by a variety of devices capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. The mobile device may receive and transmit signals via appropriate apparatus for receiving and transmitting signals. The transceiver may be provided for example by means of a radio part and associated antenna arrangement. The antenna arrangement may be arranged internally or externally to the mobile device. A wireless communication device can be provided with a Multiple Input/Multiple Output (MIMO) antenna system.

The device 1 can be configured to operate in more than one access system and frequency. Selection of the appropriate access technology can be based on priority lists received from base stations. An appropriate priority list can be selected by an element controlling a base station. The selection can be based on information received from a network element maintaining subscriber information, for example a home subscriber server (HSS) or a home location register (HLR).

In accordance with an embodiment a RAT frequency selection priority (RFSP) index (RFSPid) is provided. Each user equipment or user may have been assigned with a user specific Subscriber RFSP index value. According to a possibility several users may have the same RFSPid value(s). The RFSP index is a conditional parameter that may have 256 different values, i.e. there can be 256 different index values that can be assigned to a user. The RFSP Index can be mapped in the access network by an eNodeB, a BSC (base station controller) or a RNC (radio network controller) to a locally defined configuration in order to apply specific strategies such as traffic steering. A RFSP index value provided to a base station can be mapped for example to absolute priority (AP) lists maintained in the base station or elsewhere in the access network system and sent in an appropriate message to the user equipment. For example the message may be an RRC connection release message.

The AP list is a list of RAT/frequencies with priorities. Next time user equipment (UE) performs an attach procedure the UE would try to attach to RAT/frequency in a given order starting from highest priority RAT/frequency. Since the delivery of AP list may be provided in dedicated signaling the list can be pointed to specific user(s)/UE(s) and thus allow steering at the individual level. In other words the RFSP index for a specific UE may be modified to change the behavior of the UE.

Different RFPS index values can be mapped to different AP lists. Some AP lists prioritize networks providing a better level of service (e.g. LTE) and some AP lists can prioritize networks offering a lower level of service (e.g. GSM or WCDMA). For some users a better network is given by allocating corresponding RFSP index and for some others a worse network is given by again allocating the corresponding RFSP index.

In the herein described examples dynamic cell selection profiles are created and dynamic lists are provided for the communication devices. Thus, for example instead of static absolute priority (AP) lists dynamic traffic steering can be provided where it is possible to take information such as cell load or information associated with served users into account. Such other information can be e.g. customer experience for served users. This can be used to avoid a situation where users of a certain type may be steered away from a cell irrespective the load situation. For example, lower-end users, or users that could tolerate worse performance, may be transferred from a loaded LTE cell to e.g. a 3G cell while higher-end user, or users that would require better performance for some other reason, are provided with a LTE based service.

Figure 3:
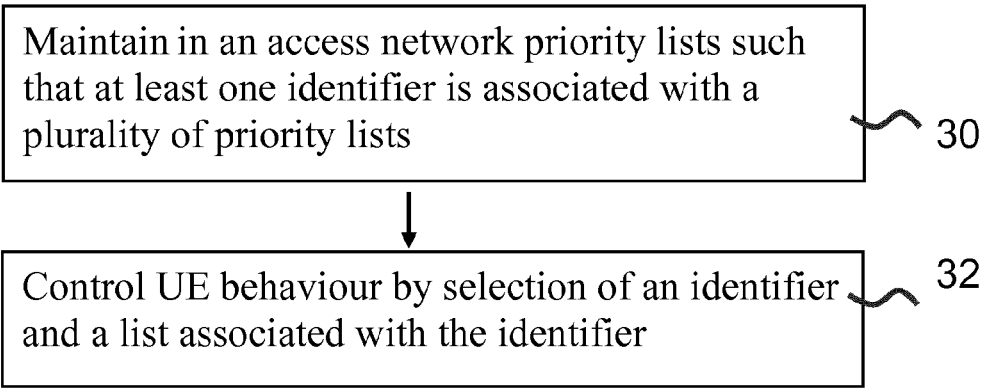
FIGS. 3 and 4 are flowcharts illustrating certain aspects.

The flowchart of FIG. 3 shows an example of a method for a radio access system where such control of communication device behavior is provided. An access network node maintains at 30 radio access priority profiles based on access technology priority lists. In the set of priority lists at least one access list identifier is associated with a plurality of access technology priority lists. The access list identifier may comprise for example a radio access technology frequency selection priority index or an identifier defining a group of radio access technology frequency selection priority indexes.

Behavior of at least one communication device in the radio access system is controlled at 32 by selecting one of the access technology selection priority lists based on information regarding an access list identifier and the radio access system Information about the selected priority list may then be communicated to the at least one communication device. The plurality of access technology priority lists can be configured for different load conditions. The access network controller can select an appropriate priority list based on load information. The load information can be obtained in various manners. In accordance with non-limiting examples, a node such as an eNB can define load condition based on its own measurements, such as number of available and/or used physical radio resource blocks (PRB), based on UE measurements, such as received signal strength and/or quality and/or received load information from neighboring eNBs. In case of 3G based networks radio network controllers have such information available from all nodeBs under its control.

Figure 4:
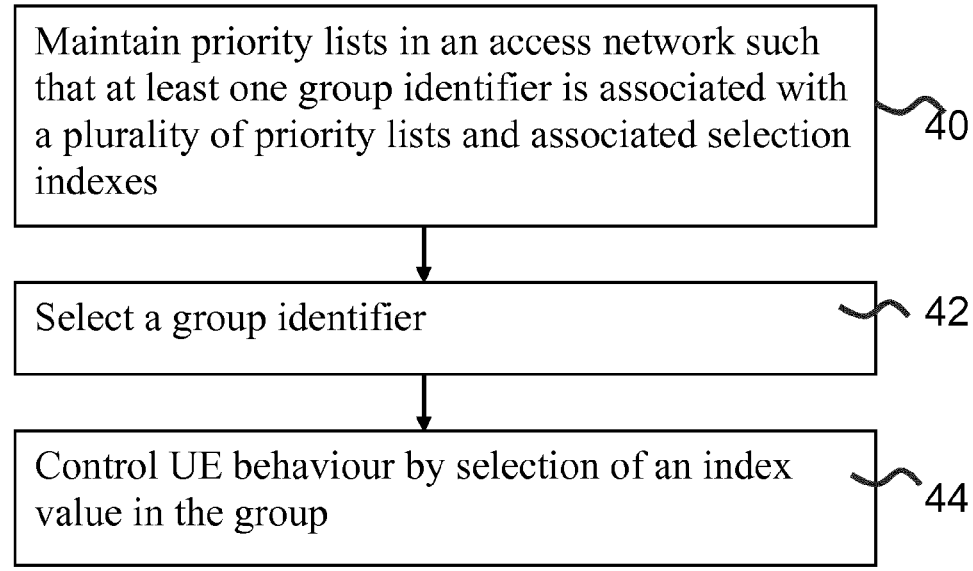

FIG. 4 shows an embodiment where the lists and associated selection indexes are divided into groups. For example, a set of lists can be segmented into groups. As above, an access network node maintains at 40 radio access priority profiles based on a set of access technology priority lists. In the set of priority lists at least one group identifier is associated with a plurality of access technology priority lists. The identifier may define a group of radio access technology frequency selection priority indexes. Behavior of at least one communication device in the radio access system is controlled by selecting a group identifier at 42 by the node. The access priority lists associated with the radio access technology frequency selection priority indexes can be identical in the selected group, i.e. a single list can be associated with several index values. Different indexes in a group can have different meaning for other control functions and therefore different features can be provided within a group based on selection of an index value. Thus control on the behaviour of the communication device can be provided at 44 by selection of an appropriate priority index from the group.

The following describes more detailed examples of mechanisms in which network element based optimization algorithm can take customer experience insights into account.

A matrix of AP lists can be created so that each RFSP index value may have several different AP lists mapped to it for e.g. different load conditions. An example of this is shown in Table 1 of FIG. 5. According to a possibility show in Table 3 of FIG. 7 several RFSP index values (e.g. a segment or a range of RFSPindex values) are mapped to same AP list for idle mode camping purposes, while different RFSP index values (within a segment) can be used differently by other algorithms, such as active mode load balancing.

The matrixes can be configured in an appropriate network element, for example in eNB, a radio network controller (RNC) or a base station controller (BSC).

According to an aspect the network element, such as eNB/RNC/BSC, can locally decide which users are steered away from a cell in question based on information such as customer experience insights and status of that cell. This can be done by configuring several AP lists/tables for a base station so that each RFSP index value corresponds to several AP lists or several broadcasted AP lists are otherwise constructed so that different cell load conditions can be taken into account. A node associated with the radio access system such as eNB/RNC/BSC then selects a list to be broadcasted or signalled to UE based on current cell load.

Another possibility is to configure a single AP list that is mapped to several RFSP index values for different types of users. This can be based on e.g. different measured customer experience. This enables use of the RFSP index value space in segmented manner so that in a segment different users would have the same camping policy while users could be treated differently in different load situations. For example, RFSP index can be taken into account in load balancing decisions.

An example of how several AP lists can be configured per a RFSPindex (RFSPid) value for different load conditions is shown in Table 1 of FIG. 5. In the example the cell reselection priority can have values from 0 to 7, 0 being the lowest and 7 the highest priority. In this example users RFSPindex value 1 always prioritizes RAT LTE2.6 regardless the load condition. However, users with RFSPindex value 2 and 256 prioritize other RATs/Frequencies with higher loads. That is, with index value 2 UMTS2.1 and with index value 256 2G1800 access technologies are prioritized.

The matrix of cell reselection priorities can be configured to eNB/RNC/BSC as a part of regular configuration management processes. eNB/RNC/BSC can select proper list to be signalled to users based on load situation in the cell. The signalling can be provided as a part of radio resource control (RRC) Connection Release procedure, for example. Once receiving AP list a user equipment can select RAT/frequency for camping according to priorities given in received AP list. An effect of the eNB/RNC/BSC making a decision to change used AP list is that subscribers with higher RFSPIndex value can be steered away from this cell when cell load gets higher.

In addition to cell load level other information available in the radio network for a node such as eNB/RNC/BSC can be used. An example of such information is information of the quality of service (QoS) class for different users. Also a combination of the above could be used. For example, a list for lower QoS users could be constructed such that they would more easily move to another RAT in case of high load.

Table 2 of FIG. 6 shows another example where AP lists for different conditions are broadcast to UEs. In this case all users receive the same priority list that eNB/RNC/BSC has selected based on load condition in the cell.

Many features can benefit a subscriber specific approach. For example, idle mode traffic steering, load balancing, packet scheduling and so on may take advantage of this. In this case many of these features can benefit from RFSP index parameter specified per subscriber in their home subscriber server (HSS) profiles.

Overload of RFSPindex values for multiple different purposes may be problematic as the same RFSPindex value may have different implications for different features. To overcome this the information used for idle mode camping and the information used for e.g. load balancing can be separated. Table 3 of FIG. 7 shows an example of grouping the indexes by segmenting RFSPindex values so that RFSPindex could be used multiple purposes.

The separations can be provided by segmenting RFSP index values for example as follows:

Segment 1={1, 2, 3}, i.e., it consists of RFSP indexes 1, 2 and 3

Segment 2={4, 5, 6}

Etc

For each segment, the same AP list is used, i.e., the AP list for RFSP index values within a segment is the same, for example:

for segment1 AP1={LTE2.6, LTE800, UTMS2.1, UMTS900, 2G1800, 2G900} for segment2 AP2={UTMS2.1, UMTS900, 2G1800, 2G900}

AP lists can be the same for all RFSPindexes within a segment. However, different RFSPindexes within the segment can relate to different control features and can thus be used differently with some other features, e.g. load balancing. For example, in FIG. 7 segment 1 is made from 3 RFSPid values and each RFSPid values refer to the same AP list. However RFSP index 1 can refer to load balancing strategy 1, RFSP index 2 to load balancing strategy 2 and so on.

By means of this idle mode camping can be steered by segment number as the AP list is the same for each RFSPIndex value within a segment. RFSP index values within a segment can then be used in e.g. load balancing or scheduling. In these cases it can be assumed that RFSP index values within a segment are ordered from e.g. best to worst. For example in load balancing, users within different segments are moved in the order given by RFSP index. For example, users in the first segment are moved first, then users in the second segment are moved and so on. Thus idle mode camping is steered based on the segment number and load balancing based on an order defined by RFSP index within a segment. This separates idle mode steering from steering in load balancing and makes it possible to use insight of customer experience as a basis of load balancing decisions.

In other examples RFSPindex values within a segment can be used for controlling features such as packet scheduling, admission control, congestion control and so on. Also, a segment number can refer to other features such as load balancing instead of traffic steering. Segmenting can be done further so that there are multiple nested segments to enable use of multiple features based on RFSPindex.

Above mechanisms can be used in combination with RFSP index based traffic steering (TS) where the index is assigned with a specific definition that can be communicated to the base station controller. In this case a subscriber can have different RFSPIndex depending e.g. on measured customer experience, i.e. RFSPindex value can be changed according to a measured parameter such as customer experience.

The various embodiments above can be provided as alternatives or as complementary solutions.

Appropriate means can be provided to implement the described methods and steps thereof.

The required data processing apparatus and functions of a radio access network, a communication device and any other appropriate station or element required for putting the invention into effect can be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

Appropriate software and hardware can provide means for implementing the above described method An appropriately adapted computer program code product or products may be used for implementing the embodiments, when loaded or otherwise provided on an appropriate data processing apparatus, for example for causing determinations of mappings between different identifiers and priority lists and when, what and where to communicate and communications of information between the various nodes. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that whilst embodiments have been described in relation to communications system such as those based on 3GPP systems, similar principles can be applied to other communication systems. For example, the above principles can be used where relay nodes are employed for relaying transmissions. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:

1. A method for a radio access system, comprising
    maintaining access technology priority lists and related access list identifiers in a radio access system such that at least one access list identifier is associated with a plurality of access technology priority lists, the maintaining comprising grouping a plurality of radio access technology frequency selection priority indexes into groups, each group corresponding to an individual segment and comprising multiple indexes, and wherein the at least one access list identifier comprises one of the segments,
    selecting for at least one communication device one of the access technology selection priority lists based on information regarding an access list identifier and the radio access system, the selecting comprising selecting a segment based on a first control feature and selecting one of the indexes in the group corresponding to the selected segment based on a second control feature, and
    controlling behavior of the at least one communication device in the radio access system by signaling information corresponding to one or more results of the selecting to the at least one communication device to cause the at least one communication device to use the selected access technology priority list.

2. A method according to claim 1, comprising using for idle mode camping a configuration where several radio access technology frequency selection priority indexes are mapped to a same access priority list.

3. A method according to claim 1, comprising using values within each segment for at least one of traffic steering, load balancing, congestion control, admission control, and packet scheduling.

4. A method according to claim 1, comprising selecting an access technology priority lists by an enhanced NodeB, a radio network controller or a base station controller.

5. An apparatus for a radio access system, the apparatus comprising at least one processor, and at least one memory including computer program code, wherein the at least one memory and the computer program code are configured, with the at least one processor, to cause the apparatus to perform operations comprising:
    maintain access technology priority lists and related access list identifiers such that at least one access list identifier is associated with a plurality of access technology priority lists, the maintaining comprising grouping a plurality of radio access technology frequency selection priority indexes into groups, each group corresponding to an individual segment and comprising multiple indexes, and wherein the at least one access list identifier comprises one of the segments,
    selecting for at least one communication device one of the access technology selection priority lists based on information regarding an access list identifier and the radio access system, the selecting comprising selecting a segment based on a first control feature and selecting one of the indexes in the group corresponding to the selected segment based on a second control feature, and control behavior of the at least one communication device in the radio access system based by signaling information corresponding to one or more results of the selecting to the at least one communication device to cause the at least one communication device to use the selected access technology priority list.

6. An apparatus according to claim 5, wherein the at least one memory and the computer program code are configured, with the at least one processor, to cause the apparatus to perform using for idle mode camping a configuration where several radio access technology frequency selection priority indexes are mapped to a same access priority list.

7. An apparatus according to claim 5, wherein the at least one memory and the computer program code are configured, with the at least one processor, to cause the apparatus to perform using values within each segment for at least one of traffic steering, load balancing, congestion control, admission control, and packet scheduling.

8. A node for a radio access network comprising the apparatus according to claim 5.

9. A node according to claim 8, comprising an enhanced NodeB, a radio network controller or a base station controller.

10. A computer program product comprising a non-transitory computer readable medium comprising program code configured to cause an apparatus to perform, when the program code is run on the apparatus, operations comprising:

maintaining access technology priority lists and related access list identifiers in a radio access system such that at least one access list identifier is associated with a plurality of access technology priority lists, the maintaining comprising grouping a plurality of radio access technology frequency selection priority indexes into groups, each group corresponding to an individual segment and comprising multiple indexes, and wherein the at least one access list identifier comprises one of the segments, selecting for at least one communication device one of the access technology selection priority lists based on information regarding an access list identifier and the radio access system, the selecting comprising selecting a segment based on a first control feature and selecting one of the indexes in the group corresponding to the selected segment based on a second control feature, and controlling behavior of the at least one communication device in the radio access system by signaling information corresponding to one or more results of the selecting to the at least one communication device to cause the at least one communication device to use the selected access technology priority list.

11. A method according to claim 1, wherein the first control feature is idle mode camping and the second control feature is load balancing.

12. A method according to claim 11, wherein selecting one of the indexes in the group comprises selecting the one index for load balancing based on an order defined by radio access technology frequency selection index within the selected segment.

13. A method according to claim 11, wherein the indexes for at least one of the groups comprise a same value but each of the indexes in the at least one group refers to different load balancing strategies.

14. An apparatus according to claim 5, wherein the first control feature is idle mode camping and the second control feature is load balancing.

15. An apparatus according to claim 14, wherein selecting one of the indexes in the group comprises selecting the one index for load balancing based on an order defined by radio access technology frequency selection index within the selected segment.

16. An apparatus according to claim 14, wherein the indexes for at least one of the groups comprise a same value but each of the indexes in the at least one group refers to different load balancing strategies.

* * * * *